UNITED STATES PATENT OFFICE

WATSON H. WOODFORD, OF BRIDGEPORT, CONNECTICUT, ASSIGNOR TO REMINGTON ARMS COMPANY, INC., A CORPORATION OF DELAWARE

LIQUID COATING COMPOSITION

No Drawing.   Application filed September 10, 1927.  Serial No. 218,855.

This invention relates to lacquers or varnishes and especially to a composition which may be applied over a surface which is coated or contaminated with wax or grease, and adheres to and completely covers such a surface, and quickly dries thereon.

It is well known that ordinary varnishes and lacquers cannot be applied to surfaces upon which waxes, greases, or oils are present. The varnish or lacquer does not adhere to a greasy surface and special difficulties are encountered if a wax such as paraffin wax is present.

While a paraffin surface does not repel lacquer or varnish, the drying of the lacquer or varnish on such a surface is retarded indefinitely. If the surface dries at all, a soft paraffin finish and not a hard varnish finish is secured. It is thought that the reaction which occurs when a volatile solvent lacquer or varnish is applied over paraffin is analogous to the action of paint and varnish removers consist essentially of a suspension of paraffin wax in acetone and/or benzine. When this fluid is spread upon a surface, the evaporation of a small amount of the solvent forms a continuous and impervious film of paraffin wax over the remaining solvent and prevents further evaporation. The solvent is thus enabled to penetrate and soften the paint or varnish to be removed.

Quick drying varnishes and lacquers use as solvents acetone, benzine, alcohol, and similar substances. It is thought that when such a varnish or lacquer is applied over paraffin, paraffin is dissolved in the solvent and quickly reaches the free surface where a film analogous to the paint remover film is formed and the drying of the varnish is thereby greatly retarded.

In certain industrial processes, for example, the manufacture of paper tubes for shot shell bodies, the use of paraffin impregnated paper is highly desirable on account of the capacity of paraffin for absorbing heat. Referring particularly to shot shells, when a shot shell is fired, a very large quantity of heat is generated within the shell by the combustion of the powder and momentarily a high temperature is reached. The temperature drops rapidly and probably within a few seconds has been reduced below the charring point of the cartridge paper from which the shot shells are made. However, it is manifestly very important that the paper be protected during the brief period of its exposure to intense heat, and paraffin has been quite universally used in the manufacture of shot shells as a heat absorbent and for other desirable properties. If the paper shot shell is well impregnated with paraffin, it does not reach a temperature at which an undesirable or dangerous amount of charring takes place.

However, it is also very desirable that shot shells be made impervious to moisture. While paraffin, itself, is somewhat moisture resistant, it is incapable of preventing the absorption by the paper of a sufficient amount of moisture to cause such swelling of shot shells as will render them useless. For this reason, methods for producing shot shells which are heat resistant and at the same time capable of receiving a coat of varnish have long been sought. The application of varnish to a paraffin impregnated paper has hitherto been considered impossible for the reasons above discussed. The present invention comprises the discovery of a varnish which may be applied to a paraffin surface and will dry upon such a surface with extreme rapidity, completely covering the surface with a film which is, itself, quite impervious to moisture and upon which other varnishes or lacquers may be applied to secure special finishes if desired.

The usual varnishes and lacquers comprise not only a gum or pyroxylin base which furnish the body of the film and a volatile solvent for the base, but also a plasticizing ingredient for toughening the film and rendering it more flexible. It has been found that a varnish consisting merely of a glyceride ester of rosin, colophony, the copals and similar substances dissolved in acetone shows most extraordinary characteristics. When applied to a paraffin surface it dries with extreme rapidity. Indeed, its drying time is so brief as to lead to the belief that some reaction other than the ordinary evaporation of the solvent must take place.

When an ordinary shot shell tube is dipped in this varnish, the surface dries completely in about ten seconds' time, leaving a film which appears to consist substantially entirely of ester resin, no paraffin having been dissolved and none being present on the surface.

While varying amounts of the ester gum may be used, the best results have been secured by a composition which includes about 25%, by weight, of the gum. This quantity of the solid does not appear to be completely dissolved. Upon standing, the composition separates into two quite distinct layers, but both layers appear cloudy. This appearance may be due to the presence of undissolved solid in suspension. One possible explanation of the extraordinarily rapid drying is that the composition is really a super-saturated solution and, therefore, unstable, and that when the super-saturated solution is spread upon a surface, the evaporation of a very small amount of solvent disturbs an unstable equilibrium and extremely rapid precipitation of the excess of the solid in solution results.

It has been noted that the presence of a small percentage of toluene, entirely clears the cloudiness of the composition and destroys its quick drying character. Apparently, in the presence of toluene, the ester gum is much more soluble in acetone and a normal stable solution is secured from which the solvent merely evaporates in the usual way when it is spread upon a surface.

The film secured by the application of such ester gum acetone varnish is tough and flexible, though somewhat soft for some purposes. However, the paraffin is effectively and completely covered, and ordinary varnishes or lacquers may be applied over the ester gum varnish if greater hardness or other special properties are desired.

In the appended claims the terms "ester gum" will be understood to include any glyceride ester of rosin, colophony, the copals and similar substances.

Varnish which will cover and dry upon a waxed surface being new with this applicant, the appended claims are to be broadly construed.

What is claimed is:

1. A varnish consisting of ester gum and acetone.

2. A varnish comprising acetone and an excess of ester gum dissolved and suspended therein.

3. A varnish consisting of substantially 75% of acetone and 25% ester gum.

4. A varnish consisting of ester gum and acetone having the property of drying when spread in about ten seconds' time.

5. A varnish comprising acetone as a solvent having the property of rapidly and completely drying upon a paraffin surface.

6. The method of covering a paraffin surface which comprises the application thereto of a varnish consisting of ester gum in acetone.

7. The method of waterproofing paraffined paper tubes and the like which comprises the application thereto of a varnish consisting of ester gum in acetone.

8. A paper tube having applied thereto a varnish consisting of ester gum in acetone.

9. A shot shell having applied thereto a varnish consisting of ester gum and acetone.

10. A paraffined paper tube for shot shells having applied thereto a varnish consisting of ester gum and acetone.

WATSON H. WOODFORD.